United States Patent

Sakai et al.

Patent Number: 5,115,010
Date of Patent: May 19, 1992

[54] FIRE-RETARDANT POLYAMIDE COMPOSITION HAVING GOOD HEAT RESISTANCE

[75] Inventors: Hideki Sakai, Iwakuni; Kazuo Ishiwatari, Obatake; Fumitoshi Ikejiri, Iwakuni, all of Japan

[73] Assignee: Mitsui Petrochemical Industries, Inc., Tokyo, Japan

[21] Appl. No.: 684,517

[22] Filed: Apr. 15, 1991

Related U.S. Application Data

[63] Continuation of Ser. No. 512,507, Apr. 20, 1990, abandoned, which is a continuation of Ser. No. 183,688, Apr. 19, 1988, abandoned.

[30] Foreign Application Priority Data

Apr. 20, 1987 [JP] Japan ................................. 62-95082
Nov. 25, 1987 [JP] Japan ................................. 62-295341

[51] Int. Cl.$^5$ .............................................. C08K 7/14
[52] U.S. Cl. .................................. 524/410; 524/414; 524/424; 524/432; 524/433; 524/469; 524/373
[58] Field of Search ............... 524/410, 414, 424, 433, 524/432, 373, 469

[56] References Cited

U.S. PATENT DOCUMENTS

| | | | |
|---|---|---|---|
| 3,418,267 | 12/1968 | Busse | 524/606 |
| 3,810,861 | 5/1974 | Tacke et al. | 524/411 |
| 3,897,346 | 7/1975 | Vogel | 252/609 |
| 3,897,389 | 7/1975 | Touval | 524/410 |
| 4,085,088 | 1/1978 | Miyata et al. | 524/436 |
| 4,141,880 | 2/1979 | Nametz et al. | 524/411 |
| 4,142,031 | 2/1979 | Kato et al. | 524/433 |
| 4,268,432 | 5/1981 | Maslen et al. | 524/411 |
| 4,360,624 | 11/1982 | Huang et al. | 524/432 |
| 4,548,972 | 10/1985 | Williams | 524/411 |
| 4,675,356 | 6/1987 | Miyata | 524/436 |
| 4,729,854 | 3/1988 | Miyata et al. | 524/436 |

FOREIGN PATENT DOCUMENTS 56-2100 10/1929 Japan.
51-47034 4/1976 Japan.
61-188463 8/1986 Japan.

Primary Examiner—Veronica P. Hoke
Attorney, Agent, or Firm—Sherman and Shalloway

[57] ABSTRACT

A composition comprising (I) a thermally stable polyamide such as an aromatic polyamide, (II) a halogenated polystyrene or a halogenated polyphenylene oxide, and (III) sodium antimonate has excellent fire retardancy and excellent thermal stability during molding. The thermal stability of the composition is further enhanced by including (IV) a hydrotalcite-type complex hydroxide or (V) magnesium oxide and/or zinc oxide.

4 Claims, No Drawings

FIRE-RETARDANT POLYAMIDE COMPOSITION HAVING GOOD HEAT RESISTANCE

This application is a continuation of Ser. No. 07/512,507, filed Apr. 20, 1990, now abandoned and a continuation in turn of U.S. Ser. No. 07/183,688 filed Apr. 19, 1988, all now abandoned.

BACKGROUND OF THE INVENTION

1. Field of the Invention

This invention relates to a fire-retardant, or flame-retardant, polyamide composition having good heat resistance. More specifically, it relates to a fire-retardant polyamide composition having markedly improved thermal stability during molding.

2. Description of the Prior Art

Polyamides typified by 6 nylon and 66 nylon have excellent mechanical strength, rigidity, heat resistance and oil resistance, and by utilizing these properties, attempts have been made to exploit their applications as engineering plastics in some machine parts, electrical appliance parts and automobile parts. To improve their heat resistance and rigidity further, compositions of polyamides and glass fibers have also been used.

Polyamides composed of aromatic dicarboxylic acids such as terephthalic acid and aliphatic alkylenediamines (Japanese Laid-Open Patent Publication No. 53536/1984) or polyamides composed of aromatic diamines such as xylylenediamine and aliphatic dicarboxylic acids (Japanese Laid-Open Patent Publication No. 200420/1982) are known as polyamides having improved mechanical strength, rigidity and heat resistance over 6 nylon and the like.

Since polyamides, like other thermoplastic resins such as polyolefins, are liable to catch fire and burn, the addition of a fire retardant is required when the polyamides are to be used in fields requiring self-extinguishing property and flame retardancy. A composition of a polyamide and a halogenated polystyrene (Japanese Laid-Open Patent Publication No. 47034/1976) and a composition of a polyamide and a condensation product of brominated phenol (Japanese Patent Publication No. 2100/1981) have been proposed for such fire-retarding purposes. These patent documents disclose that glass fibers as a reinforcing agent and antimony trioxide as a fire-retarding aid may further be incorporated.

However, since polyamides, especially polyamides having excellent heat resistance, are generally compounded at high temperatures, the fire retardants are decomposed during compounding or during molding to cause foaming or corrode molding machines. Hence, problems still exist with regard to thermal stability.

SUMMARY OF THE INVENTION

It is an object of this invention to remove the aforesaid defects of conventional fire-retardant polyamide compositions.

It is another object of this invention to provide a polyamide composition which while retaining excellent fire retardancy, is free from foaming and coloration even at high compounding temperatures, and also gives a solution to the problem of corrosion on a molding machine.

According to this invention, there is provided a fire-retardant polyamide composition having good heat resistance comprising (I) 100 parts by weight of a polyamide having excellent heat resistance, (II) 10 to 100 parts by weight of a halogenated polystyrene or a halogenated polyphenylene oxide, and (III) 0.5 to 50 parts by weight of sodium antimonate.

According to a preferred embodiment of this invention, there is provided a polyamide composition comprising the components (I), (II) and (III), and 0.1 to 5 parts by weight of hydrotalcite-type complex hydroxide or its calcination product (IV).

According to another preferred embodiment of this invention, there is provided a polyamide composition comprising the components (I), (II) and (III), and 0.05 to 50 parts by weight of magnesium, oxide and/or zinc oxide (V).

DETAILED DESCRIPTION OF PREFERRED EMBODIMENTS

In the present invention, polyamides which are thermoformable and have particularly superior heat resistance, such as aromatic group-containing polyamides and nylon 4, 6, are used to provide molded articles having excellent heat resistance. Since nylons are liable to catch fire and burn, fire retardants have to be used. In the present invention, halogenated polystyrenes or halogenated polyphenylene oxides are used as such fire retardants and sodium antimonate is used as a fire retarding aid.

The halogenated polystyrenes and halogenated polyphenylene oxides are known fire retardants. According to this invention, the use of the fire retardant in combination with sodium antimonate makes it possible to enhance the fire retardancy of the polyamide and therefore its thermal stability during molding. Antimony trioxide is known as a fire retarding aid for the halogenated polystyrene or halogenated polyphenylene oxide. With this known combination, the desired fire retardancy is obtained, but the thermal stability of the resulting polyamide composition is low during molding so that the molded article is inevitably degraded in color or mechanical strength. These defects can be effectively eliminated in accordance with this invention by combining sodium antimonate with the halogenated polystyrene or the halogenated polyphenylene oxide.

The aforesaid polyamide/halogenated polystyrene or halogenated polyphenylene oxide/sodium antimonate combination hardly decomposes at a molding or compounding temperature of not more than 300° C. But at temperatures exceeding 300° C., its thermal resistance becomes insufficient to cause coloration or reduce the mechanical properties of the resin composition. This tendency becomes more pronounced in polyamide articles requiring heat resistance because the compounding temperature or the molding temperature is higher. In accordance with a preferred embodiment of this invention, it has been found that by further incorporating hydrotalcite-type complex hydroxide (IV) or magnesium oxide and/or zinc oxide (V) in the above three-component system, thermal decomposition of the fire retardant, etc. is inhibited and coloration and foaming of the molded article and corrosion of molding machines are prevented while the excellent fire retardancy of the three-component system is retained.

The inhibition of thermal decomposition of the three-component composition at high temperatures by the addition of hydrotalcite-type complex hydroxide or magnesium oxide and/or zinc oxide is the phenomenon observed by the present inventors, and no theoretical reason has yet been assigned to it. The present inventors, however, presume as follows: The thermal decomposition of the above comosition is considered to be a self-catalyzed thermal decomposition reaction in which hydrogen halide is formed as a by-product and acts as catalyst. Magnesium oxide or zinc oxide or the complex hydroxide added to the composition captures the hydrogen halide and terminates its chain.

In the present invention, the halogenated polystyrene or halogenated polyphenylene oxide as component (II) is used in an amount of 10 to 100 parts by weight, preferably 15 to 75 parts by weight, per 100 parts by weight of the polyamide (on the same basis hereinafter). If the amount of the component (II) is smaller than the specified lower limit, its fire retarding effect is not sufficient. If it is larger than the specified upper limit, its fire retarding effect is saturated, and the mechanical strength of the resulting molded article is degraded.

Sodium antimonate as component (III) should be used in an amount of 0.5 to 50 parts by weight, preferably 1 to 15 parts by weight. If the amount of component (III) is less than the specified lower limit, its fire retarding effect is insufficient. If it exceeds the specified upper limit, no corresponding effect of increasing fire retardancy can be obtained, and rather the mechanical strength of the resulting product is reduced.

Magnesium oxide and/or zinc oxide as component (V) should be used in an amount of 0.05 to 50 parts by weight, preferably 0.1 to 10 parts by weight. If the amount of component (V) is less than the specified lower limit, its heat stabilizing effect at high temperatures is insufficient. If it exceeds the specified upper limit, the resulting molded product tend to have insufficient mechanical strength or impact strength.

The hydrotalcite-type complex hydroxide or its calcination product as component (IV) should be used in an amount of 0.1 to 5 parts by weight, preferably 0.2 to 3 parts by weight, for the same reason as above.

Polyamide

The polyamide used in this invention has excellent heat resistance and is compounded or molded generally at temperatures of as high as 280° to 380° C., particularly 300° to 370° C. It may be, for example, a polyamide in which an aromatic group-containing component is included at least as part of the dicarboxylic acid component, diamine component and aminocarboxylic acid component constituting the polyamide.

Preferred polyamides for use in the present invention are composed of (a) units of a dicarboxylic acid component composed of terephthalic acid and/or another aromatic dicarboxylic acid, and (b) units of a diamine component composed of an aliphatic and/or alicyclic diamine.

The units (a) may be terephthalic acid units alone, or a mixture of terephthalic acid units and units of another aromatic dicarboxylic acid, or units of the other aromatic dicarboxylic acid alone. Examples of the units of the other aromatic dicarboxylic acid are units of isophthalic acid, phthalic acid, 2-methylterephthalic acid and naphthalenedicarboxylic acid. The isophthalic acid units or naphthalenedicarboxylic acid units, particularly the former, are preferred.

In this embodiment of the invention, it is preferred that terephthalic acid account for 60 to 100 mole % of the dicarboxylic acid units (a), and the other aromatic dicarboxylic acid, 0 to 40 mole % of the units (a). If the proportion of terephthalic acid is less than 60 mole % and the proportion of the other aromatic dicarboxylic acid is larger than 40 mole % in the dicarboxylic acid units (a), a molded article prepared from a composition containing such a polyamide may be disadvantageous in regard to thermal properties including heat distortion temperature, mechanical properties such as tensile strength, flexural strength and abrasion resistance and other chemical and physical properties such as chemical resistance and water resistance. In some applications, however, the required properties are not stringent, and a polyamide comprising less than 60 mole % of terephthalic acid units, and in an extreme case, a polyamide comprising the other aromatic dicarboxylic acid units as the sole dicarboxylic acid units may be used.

In the aforesaid embodiment of this invention, the dicarboxylic acid units (a) may permissibly contain a small amount, for example about 10 mole %, of units of a polycarboxylic acid such as adipic acid, sebacic acid, trimellitic acid or pyromellitic acid in combination with the terephthalic acid units and/or units of the other aromatic dicarboxylic acid.

In the preferred polyamides used in this invention, the aliphatic diamine units are units of a linear or branched alkylenediamine having 4 to 25 carbon atoms, especially 6 to 18 carbon atoms. Specific examples of such alkylenediamine units include units of 1,4-diamino-1,1-dimethylbutane,
1,4-diamino-1-ethylbutane,
1,4-diamino-1,2-dimethylbutane,
1,4-diamino-1,3-dimethylbutane,
1,4-diamino-1,4-dimethylbutane,
1,4-diamino-2,3-dimethylbutane,
1,2-diamino-1-butylethane,
1,6-diaminohexane,
1,7-diaminoheptane,
1,8-diaminooctane,
1,6-diamino-2,5-dimethylhexane,
1,6-diamino-2,4-dimethylhexane,
1,6-diamino-3,3-dimethylhexane,
1,6-diamino-2,2-dimethylhexane,
1,9-diaminononane,
1,6-diamino-2,2,4-trimethylhexane,
1,6-diamino-2,4,4-trimethylhexane,
1,7-diamino-2,3-dimethylheptane,
1,7-diamino-2,4-dimethylheptane,
1,7-diamino-2,5-dimethylheptane,
1,7-diamino-2,2-dimethylheptane,
1,10-diaminodecane,
1,8-diamino-1,3-dimethyloctane,
1,8-diamino-1,4-dimethyloctane,
1,8-diamino-2,4-dimethyloctane,
1,8-diamino-3,4-dimethyloctane,
1,8-diamino-4,5-dimethyloctane,
1,8-diamino-2,2-dimethyloctane,
1,8-diamino-3,3-dimethyloctane,
1,8-diamino-4,4-dimethyloctane,
1,6-diamino-2,4-diethylhexane,
1,9-diamino-5-methylnonane,
1,11-diaminoundecane, and
1,12-diamindodecane.

These aliphatic diamines are positively used mainly when the dicarboxylic acid units (a) contain terephthalic acid units as a main component.

Among these, units of 1,6-diaminohexane, 1,8-diaminooctane, 1,10-diaminodecane and 1,12-diaminododecane and mixtures thereof are preferred.

The alicyclic diamine units are units of a diamine having 6 to 25 carbon atoms and at least one alicyclic hydrocarbon ring. Specific examples include
1,3-diaminocyclohexane,
1,4-diaminocyclohexane,
1,3-bis(aminomethyl)cyclohexane,
1,4-bis(aminomethyl)cyclohexane,
isophoronediamine,
piperazine,
2,5-dimethylpiperazine,
bis(4-aminocyclohexyl)methane,
bis(4-aminocyclohexyl)propane,
4,4'-diamino-3,3'-dimethyldicyclohexylmethane,
4,4'-diamino-3,3'-dimethyldicyclohexylmethane,
4,4'-diamino-3,3'-dimethyl-5,5'-dimethyldicyclohexylmethane,
4,4'-diamino-3,3'-dimethyl-5,5'-dimethyldicyclohexylpropane,
α,α'-bis(4-aminocyclohexyl)-p-diisopropylbenzene,
α,α'-bis(4-aminocyclohexyl)-m-diisopropylbenzene,
α,α'-bis(4-aminocyclohexyl)-1,4-cyclohexane, and
α,α'-bis(4-aminocyclohexyl)-1,3-cyclohexane.

Such alicyclic diamines are positively used mainly when the dicarboxylic acid units (a) contain the other aromatic dicarboxylic acid than terephthalic acid as a main component.

Of these alicyclic diamine components, bis(aminomethyl)cyclohexane, bis(4-aminocyclohexyl)methane, 1,3-bis(aminocyclohexyl)methane, 1,3-bis(aminomethyl)cyclohexane, and 4,4'-diamino-3,3'-dimethylcyclohexylmethane are preferred. Especially preferred are bis(4-aminocyclohexyl)methane, 1,3-bis(aminocyclohexyl)methane, and 1,3-bis(aminomethyl)cyclohexane.

In the preferred polyamides used in this invention, the composition of the dicarboxylic acid units (a) is selected according to the number of carbon atoms of the diamine. When the composition of the dicarboxylic acid units (a) is so selected according to the number of carbon atoms of the diamine, the resulting polyamide composition has excellent moldability and gives molded articles which are excellent in thermal resistance characteristics such as heat aging resistance and heat distortion temperature and mechanical properties such as flexural strength and abrasion resistance.

For example, let us assume that terephthalic acid is used as a main component of the dicarboxylic acid units (a) and an aliphatic alkylenediamine is used as the diamine units (b). If the number of carbon atoms of the aliphatic alkylenediamine is 6, the dicarboxylic acid units (a) preferably consist of 60 to 85 mole % of terephthalic acid units and 15 to 40 mole % of units of another aromatic dicarboxylic acid. If the number of carbon atoms of the aliphatic alkylenediamine is 8, the dicarboxylic acid units (a) consist preferably of 65 to 100 mole % of terephthalic acid units and 0 to 35 mole % of units of another aromatic dicarboxylic acid. If the aliphatic alkylenediamine units have 10 to 18 carbon atoms, the dicarboxylic acid units (a) preferably consist of 75 to 100 mole % of terephthalic acid units and 0 to 25 mole % of units of another aromatic dicarboxylic acid.

Preferably, the polyamide (I) used in this invention has an intrinsic viscosity [η], measured in concentrated sulfuric acid at 30° C., of at least 0.5 dl/g, more preferably at least 0.6 dl/g, especially preferably 0.7 to 3.0 dl/g.

The above polyamides may be obtained by known methods, for example by polycondensing the aromatic dicarboxylic acid, as the dihalide, and the diamine which are the above-described polyamide constituting components, in solution, as described, for example, in Polymer Reviews, 10, Condensation Polymers by Interfacial and Solution Methods (P. LW. Morgan, Interscience Publishers, 1965) or Makromol. Chem., 47, 93–113 (1961). They can also be obtained by an interfacial polymerization method. Alternatively, they may be obtained by polycondensing the aromatic dicarboxylic acid and the diamine or its nylon salt by a melting technique in the presence or absence of a solvent such as water. Or they can be obtained by polycondensing an oligomer of a polyamide (obtained by the former method) by a solid-phase polymerization technique.

The polyamide containing an aromatic group-containing diamine component may be, for example, a polyamide an aromatic group-containing diamine such as m-xylylenediamine and/or p-xylylenediamine and both the aromatic group-containing diamine and the aforesaid aliphatic diamine and/or alicyclic diamine as the diamine component and an aliphatic dicarboxylic acid as the dibasic acid component. As the aliphatic dicarboxylic acid component, there may be used an aliphatic dicarboxylic acid having 4 to 15 carbon atoms, such as succinic acid, adipic acid, sebacic acid, decanedicarboxylic acid, undecanedicarboxylic acid and dodecandicarboxylic acid. An aromatic dicarboxylic acid such as terephthalic acid or isophthalic acid may be used in a proportion of less than 100 mole % of the dibasic acid component. The aromatic group-containing diamine component such as xylylenediamine is desirably present in an amount of 3 to 100 mole %, especially 50 to 100 mole %, based on the diamine component.

Examples of the polyamide containing an aromatic group-containing aminocarboxylic acid component as the aminocarboxylic acid component include polyamides composed of combinations of such aromatic group-containing aminocarboxylic acids such as para-aminobenzoic acid and para-aminophenylacetic acid with aliphatic aminocarboxylic acids such as ω-aminocaproic acid, ω-aminooctanoic acid, ω-aminoundecanoic acid and ω-aminododecanoic acid or with both aliphatic diamines and aliphatic dicarboxylic acids. The aromatic group-containing aminocarboxylic acid component is included preferably in a proportion of 30 to 100 mole %, especially 50 to 100 mole %, in the amide recurring units.

Polytetramethylene adipamide (nylon 4,6) and polyhexamethylene adipamide (nylon 6,6) may also be used as the thermally stable polyamides.

Additives

A polymer composed of recurring units of the following general formula (1)

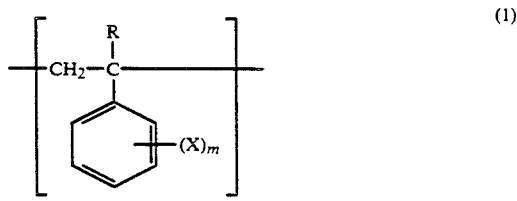

where R is H or CH$_3$, X is Br or Cl, and m is an integer of 1 to 5, is used as the halogenated polystyrene in the composition of this invention.

Specific examples of the halogenated polystyrene of general formula (1) are polydibromostyrene, polytribromostyrene, polypentabromostyrene, polydichlorostyrene, polytrichlorostyrene, polypentachlorostyrene and polytribromo-α-methylstyrene. Of these halogenated polystyrenes, polytribromostyrene is preferred because of its best effect of improving heat resistance and heat aging resistance.

The halogenated polystyrene may be produced by polymerizing a halogenated styrene or a halogenated α-methylstyrene, or halogenating polystyrene or poly-α-methylstyrene.

The halogenated polyphenylene oxide used in this invention may be a polymer composed of recurring units of the following formula (2)

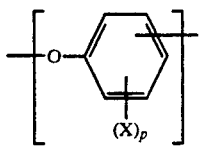
(2)

wherein X is Br or Cl and p is an integer of 1 to 4.

Examples of the halogenated polyphenylene oxide of general formula (2) are polydibromo-p-phenylene oxide, polytribromo-p-phenylene oxide, polydichloro-p-phenylene oxide, polybromo-p-phenylene oxide, and polybromo-o-phenylene oxide. Of these halogenated polyphenylene oxides, polydibromo-p-phenylene oxide is preferred because it has the best effect of improving heat resistance and fire retardancy.

The halogenated polystyrene are preferred fire retardants.

Sodium antimonate used as a fire retarding aid in this invention has the chemical composition $Na_2Sb_2O_6$ as a main component. Generally, its particle diameter is preferably not more than 30 μm, especially preferably not more than 10 μm.

Magnesium oxide and zinc oxide as a heat stabilizer are preferably as fine as possible from the standpoint of their heat stabilizing effect and the mechanical properties of the polyamide composition in which they are incorporated. Generally, these heat stabilizers have a particle diameter of desirably not more than 30 μm, preferably not more than 10 μm.

The hydrotalcite-type complex hydroxide used as a heat stabilizer may be a complex hydroxide represented by the following formula (3)

$$M_xAl_y(OH)_{2y+3y-2z}(A)_x \bullet aH_2O \quad (3)$$

wherein M is Mg, Ca or Zn, A is $CO_3$ or $HPO_4$, x, y and z are each a positive integer, and a is 0 or a positive number.

x, y and z are numbers which satisfy the following expressions.

$$8 \geq x/y \geq \frac{1}{4}, \text{ and } \frac{z}{x+y} > \frac{1}{20}.$$

Especially preferably, they satisfy the following expression.

$$1.0 \geq \frac{a}{x+y} \geq 0$$

Examples of the above hydroxide include $Mg_6Al_2(OH)_{16}CO_3 \bullet 4H_2O$, $Mg_6Al_2(OH)_{20}CO_3 \bullet 5H_2O$, $Mg_5Al_2(OH)_{14}CO_3 \bullet 4H_2O$, $Mg_{10}Al_2(OH)_{22}(CO_3)_2 \bullet 4H_2O$, $Mg_6Al_2(OH)_{16}HPO_4 \bullet 4H_2O$, $Ca_6Al_2(OH)_{16}CO_3 \bullet 4H_2O$, and $Zn_6Al_6(OH)_{16}CO_3 \bullet 4H_2O$. Complex hydroxides which are not accurately represented by the above formula may also be used. For example, a compound resulting from substitution of $CO_3$ for part of OH in $Mg_2Al(OH)_9 \bullet 3H_2O$ may be used. Compounds resulting from removal of water of crystallization from these compounds may be used. Of these complex hydroxides, those of the above formula in which M is Mg and A is $CO_3$ are preferred. Synthetic hydrotalcite of the formula $Mg_{4.5}Al_2(OH)_{13}CO_3$ obtained by calcination at 300° C. to remove water of crystallization is especially preferred because it does not release water at the time of compounding with the polyamide (I).

In addition to the above components, 5 to 250 parts by weight, especially 10 to 220 parts by weight, of a fibrous reinforcing agent may be incorporated in the polyamide composition of this invention. Incorporation of the fibrous reinforcing agent improves heat resistance, fire retardance, rigidity, tensile strength, flexural strength and impact strength further.

Examples of the fibrous reinforcing agent used in this invention include inorganic fibrous reinforcing agents such as glass fibers, potassium titanate fibers, metal-coated glass fibers, ceramic fibers, wollastonite, carbon fibers, metal carbide fibers and metal-hardened fibers. The surfaces of such fibrous reinforcing agents may be treated with silane compounds such as vinyltriethoxysilane, 2-aminopropyltriethoxysilane and 2-glycidoxypropyl-trimethoxysilane. The inorganic fibrous reinforcing agents are preferred from the standpoint of heat resistance, and glass fibers are especially preferred because of their best reinforcing effect.

The polyamide composition of this invention may further contain known additives which do not impair the objects of this invention. They include, for example, other heat stabilizers, weatherability stabilizers, plasticizers, thickeners, antistatic agents, mold releasing agents, pigments, dyes, inorganic or organic fillers, nucleating agents, carbon black, talc, clay, and mica.

Other polymers may also be incorporated in the polyamide composition of this invention. Examples of the other polymers are polyolefins such as polyethylene, polypropylene and poly(4-methyl-1-pentene), olefin copolymers such as ethylene/propylene copolymer, ethylene/1-butene copolymer, propylene/ethylene copolymer and propylene/1-butene copolymer, polyolefin elastomers, modification products of the foregoing polymers, polystyrene, other polyamides, polycarbonates, polyacetals, polysulfones, polyphenylene oxides, fluorine resins and silicone resins.

The polyamide composition of this invention can be obtained by mixing the polyamide (I), the halogenated polystyrene or the halogenated polyphenylene oxide (II), and sodium antimonate (III), and as required, the hydrotalcite-type complex hydroxide (IV), magnesium oxide and/or zinc oxide (V), and the fibrous reinforcing agent by various methods, for example, in a Henschel mixer, V-blender, ribbon blender or tumbler blender, and optionally melt-kneading the resulting mixture in a single-screw extruder, a multi-screw extruder, a kneader, or a Banbury mixer and then granulating or pulverizing the kneaded mixture.

The polyamide composition of this invention has higher thermal stability during molding than conventional polyamide compositions. Moreover, it has excellent fire retardancy, heat resistance, rigidity and impact strength and a high heat distortion temperature, and can be molded into various articles such as machine parts and electric and electronic component parts by various molding methods such as compression molding, injection molding, extrusion and thermoforming as in the case of molding general-purpose thermoplastic resin.

The preferred polyamide composition of this invention has increased thermal stability even at high compounding temperatures, and as a result, foaming or coloration can be prevented and the corrosion of molding machines by the composition of this invention can be prevented. Because of these advantages, polyamides having high heat resistance can be used in the composition of this invention.

Accordingly, the invention can provide fire-retardant polyamides having excellent heat resistance, particularly soldering resistance, and a high heat distortion temperature for use in various applications.

The following examples illustrate the present invention further. It should be understood that the invention is not limited in any way by these examples unless it departs from its scope described and claimed herein.

FR-2: PO-64P (tradename), a product of Great Lakes Co.
FR-3: SUN EPOCH NA1075 (tradename), a product of Nissan Chemical Co., Ltd.
FR-4: Antimony oxide (tradename), a product of Sumitomo Metals and Mines Co., Ltd.
SHT: DHT-4C (tradename), a product of Kyowa Chemical Co., Ltd.
GF: 03MA486A (tradename), a product of Asahi Fiberglass Co., Ltd.

The pellets obtained were then molded at a mold temperature of 110° C. by using a 2-ounce screw inline-type injection-molding machine kept at 340° C. to prepare an ASTM-No. 1 dumbbell specimen, a ½" wide Izod impact test specimen, and a burning test specimen (1/16"×½"×5").

These test specimens were observed for colors, and also subjected to a vertical burning test in accordance with UL-94 Standards, a tensile test in accordance with ASTM-D638 and an Izod impact test in accordance to ASTM-D256. The results are shown in Table 1.

TABLE 1

| Run (*) | Compounding Recipe (parts by weight) | | | | | | Combustibility | | Tensile strength ($kg/cm^2$) | Izod impact strength ($kg \cdot cm/cm$) |
|---|---|---|---|---|---|---|---|---|---|---|
| | PA-1 | FR-1 or FR-2 | FR-3 or FR-4 | SHT | GF | Color | Average burning time (seconds) | UL-94 | | |
| Ex. 1 | 100 | FR-1 36 | FR-3 7 | 1.5 | 0 | pale yellow | 1.7 | V-2 | 900 | 5 |
| Ex. 2 | 100 | FR-2 36 | FR-3 7 | 1.5 | 0 | yellow | 2.0 | V-2 | 880 | 5 |
| Ex. 3 | 100 | FR-1 36 | FR-3 7 | 0 | 100 | pale brown | 0 | V-0 | 1850 | 8 |
| Ex. 4 | 100 | FR-1 36 | FR-3 7 | 1.5 | 100 | yellow white | 0 | V-0 | 1850 | 8 |
| Ex. 5 | 100 | FR-2 36 | FR-3 7 | 1.5 | 100 | pale brown | 0.5 | V-0 | 1850 | 8 |
| Ex. 6 | 100 | FR-1 36 | FR-3 7 | 0 | 0 | yellow | 2.0 | V-2 | 890 | 5 |
| CEx. 1 | 100 | 0 | 0 | 0 | 0 | white | 4.5 | V-2 | 1100 | 5 |
| CEx. 2 | 100 | 0 | 0 | 0 | 67 | milk white | 25 | HB | 1900 | 8 |
| CEx. 3 | 100 | FR-1 40 | 0 | 0 | 0 | pale yellow | 21 | HB | 920 | 5 |
| CEx. 4 | 100 | FR-2 40 | 0 | 0 | 0 | pale brown | 23 | HB | 910 | 5 |
| CEx. 5 | 100 | FR-1 36 | FR-4 7 | 0 | 0 | black brown | 5.0 | V-2 | 450 | 1 |

(*): Ex. = Example; CEx. = Comparative Example. The same abbreviations are used in the following tables.

EXAMPLES 1-6 AND COMPARATIVE EXAMPLES 1-5

In each run, 100 parts by weight of polyamide (PA-I) composed of 70 mole % of terephthalic acid, 30 mole % of isophthalic acid and 100 mole % of 1,6-diaminohexane and having an intrinsic viscosity, measured in concentrated sulfuric acid at 30° C., of 1.0 dl/g was mixed with polytribromostyrene (FR-1) or polydibromo-p-phenylene oxide (FR-2), sodium antimonate (FR-3), antimony trioxide (FR-4), synthetic hydrotalcite (SHT) and glass fibers (GF) in the amounts indicated in Table 1. The mixture was then melt-kneaded and pelletized at 340° C. using a twin-screw vent-equipped extruder (45 mm in screw diameter).

The designations used above have the following meanings.

FR-1: Pyrochek 63PB (tradename), a product of Nissan Frror Organic Co., Ltd.

EXAMPLES 7-8 AND COMPARATIVE EXAMPLES 6-7

In each run, a polyamide composition was prepared, and tested, in the same way as in Example 1 except that polyamide (PA-II) having an intrinsic viscosity of 0.9 dl/g and composed of 30 mole % of terephthalic acid, 70 mole % of isophthalic acid, 70 mole % of 1,6-diaminohexane and 30 mole % of bis(4-aminocyclohexyl)methane was used instead of the polyamide PA-I. The results are shown in Table 2.

TABLE 2

| Run (*) | Compounding recipe (parts by weight) | | | | | Combustibility | | Tensile strength ($kg/cm^2$) | Izod impact strength ($kg \cdot cm/cm$) |
|---|---|---|---|---|---|---|---|---|---|
| | PA-II | FR-1 | FR-3 | SHT | GF | Color | Average burning time (seconds) | UL-94 | |
| Ex. 7 | 100 | 36 | 7.2 | 1.5 | 0 | pale yellow | 1.9 | V-2 | 850 | 8 |
| Ex. 8 | 100 | 36 | 7.2 | 1.5 | 100 | yellow white | 0.5 | V-0 | 840 | 8 |
| CEx. 6 | 100 | 0 | 0 | 0 | 0 | color less transparent | 5.5 | V-2 | 900 | 9 |
| CEx. 7 | 100 | 0 | 0 | 0 | 67 | white | 29 | HB | 1150 | 14 |

EXAMPLES 9-13 AND COMPARATIVE EXAMPLES 8-9

One hundred parts by weight of the same polyamide (PA-I) as in Example 1 was mixed with poly(tribromostyrene) (FR-1 as described hereinabove), sodium antimonate (FR-3 described hereinabove), magnesium oxide (high-purity magnesium oxide B, a tradename, produced by Kyowa Chemical Co., Ltd.; to be referred to as FR-5), zinc oxide (to be referred to as FR-6) and glass fibers (GF described hereinabove), and the mixture was melt-kneaded and pelletized in a twin-screw vent-equipped extruder (screw diameter 65 mm) kept at 330° C.

The state of the strands extruded from the die of the extruder was observed, and the results are shown in Table 3.

The resulting pellets were then molded at a mold temperature of 120° C. by using a 2-ounce screw inline-type injection molding machine kept at 340° C. to prepare an ASTM-No. 1 dumbbell specimen, a ½" wide Izod impact test specimen, and a burning test specimen (1/16"×½"×5").

These test specimens were observed for colors, and also subjected to a vertical burning test in accordance with UL-94 Standards, a tensile test in accordance with ASTM-D638 and an Izod impact test in accordance with ASTM-D256. The results are shown in Table 3.

sic viscosity ($\eta$), measured in concentrated sulfuric acid at 30° C., of at least 0.5 dl/g;
10 to 100 parts by weight of a halogenated polystyrene composed of recurring units of the formula

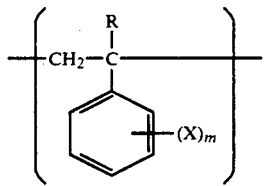

wherein R is H or $CH_3$, X is Br or Cl, and m is a number of 1 to 5, or a halogenated phenylene oxide composed of recurring units of the formula

TABLE 3

| Run | Compounding recipe (parts by weight) | | | | | State of extrusion | Color | Tensile strength (kg/cm$^2$) | Izod impact strength (kg · cm/cm) | Combustibility | |
| | PA-I | FR-1 | FR-3 | FR-5 or FR-6 | GF | | | | | Average burning time (seconds) | UL-94 |
| --- | --- | --- | --- | --- | --- | --- | --- | --- | --- | --- | --- |
| Ex. 9 | 100 | 36 | 7 | FR-5 = 1 | 0 | good | pale yellow | 900 | 5 | 1.8 | V-2 |
| Ex. 10 | 100 | 36 | 7 | FR-5 = 2 | 100 | good | yellow white | 1850 | 8 | 0 | V-0 |
| Ex. 11 | 100 | 36 | 8 | FR-5 = 8 | 100 | good | yellow white | 1850 | 8 | 0 | V-0 |
| Ex. 12 | 100 | 36 | 7 | FR-6 = 1 | 0 | good | pale yellow | 900 | 5 | 2.0 | V-2 |
| Ex. 13 | 100 | 36 | 7 | FR-6 = 1 | 100 | good | yellow white | 1850 | 8 | 0.1 | V-0 |
| CEx. 8 | 100 | 36 | 7 | 0 | 0 | burn streaks and scorch | brown | 700 | 5 | 2.0 | V-2 |
| CEx. 9 | 100 | 36 | 7 | 0 | 100 | burn streaks and scorch | brown white | 1500 | 8 | 0 | V-0 |

EXAMPLES 14-17 AND COMPARATIVE EXAMPLES 10-11

Pellets were produced as in Example 9 except that polyamide (PA-III) composed of adipic acid and 1,4-diamine was used as the polyamide and the amounts of the other components added were changed as shown in Table 4. Test specimens were produced, and tested, in the same way as in Example 9 except that the temperature of the extruder was set at 300° C. The results are shown in Table 4.

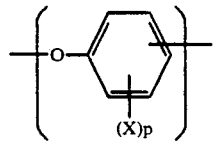

wherein X is Br or Cl and p is a number of 1 to 4;
0.5 to 50 parts by weight of sodium antimonate having a composition of the formula $Na_2Sb_2O_6$;
0.05 to 50 parts by weight of magnesium oxide; and
5 to 250 parts by weight of a fibrous reinforcing agent.

TABLE 4

| Run | Compounding recipe (parts by weight) | | | | | State of extrusion | Color | Tensile strength (kg/cm$^2$) | Izod impact strength (kg · cm/cm) | Combustibility | |
| | PA-III | FR-1 | FR-3 | FR-5 or FR-6 | GF | | | | | Average burning time (seconds) | UL-94 |
| --- | --- | --- | --- | --- | --- | --- | --- | --- | --- | --- | --- |
| Ex. 14 | 100 | 36 | 7 | FR-5 = 1 | 0 | good | milk white | 910 | 7 | 2.5 | V-2 |
| Ex. 15 | 100 | 36 | 7 | FR-5 = 2 | 100 | good | milk white | 1800 | 10 | 0.2 | V-0 |
| Ex. 16 | 100 | 36 | 7 | FR-6 = 1 | 0 | good | milk white | 900 | 7 | 2.3 | V-2 |
| Ex. 17 | 100 | 36 | 7 | FR-6 = 2 | 100 | good | milk white | 1800 | 10 | 0.3 | V-0 |
| CEx. 10 | 100 | 36 | 7 | 0 | 0 | burn streaks and scorch | brown | 800 | 6 | 2.8 | V-2 |
| CEx. 11 | 100 | 36 | 7 | 0 | 100 | burn streaks and scorch | brown white | 1700 | 8 | 0.5 | V-0 |

What we claim is:

1. A fire-retardant polyamide composition having good heat resistance, consisting essentially of:
   100 parts by weight of a polyamide having excellent heat resistance which is a polycondensation product between a dibasic acid component composed of 60 to 100 mole % of terephthalic acid and 0 to 40 mole % of an aromatic dicarboxylic acid other than terephthalic acid and an alkylenediamine component having 4 to 25 carbon atoms, and has an intrinsic 2. The composition of claim 1 wherein the proportion of the halogenated polystyrene or the halogenated polyphenylene oxide is 15 to 75 parts by weight, and the proportion of sodium antimonate is 1 to 15 parts by weight.

3. The composition of claim 1 which further comprises 0.1 to 5 parts by weight of (IV) a hydrotalcite-type complex hydroxide or its calcination product.

4. The composition of claim 1 which further comprises 0.05 to 50 parts by weight of zinc oxide.

* * * * *